United States Patent
Albanese et al.

(10) Patent No.: US 7,328,342 B2
(45) Date of Patent: Feb. 5, 2008

(54) METHOD FOR SECURE COMMUNICATION BETWEEN TWO DEVICES

(75) Inventors: Laurent Albanese, Paris (FR); Valerie Patris, Villejuif (FR)

(73) Assignee: Kudelski S.A., Chesaux-sur-Lausanne (CH)

( * ) Notice: Subject to any disclaimer, the term of this patent is extended or adjusted under 35 U.S.C. 154(b) by 751 days.

(21) Appl. No.: 10/474,588

(22) PCT Filed: Apr. 17, 2002

(86) PCT No.: PCT/FR02/01324

§ 371 (c)(1),
(2), (4) Date: Nov. 13, 2003

(87) PCT Pub. No.: WO02/087144

PCT Pub. Date: Oct. 31, 2002

(65) Prior Publication Data

US 2005/0033964 A1 Feb. 10, 2005

(30) Foreign Application Priority Data

Apr. 19, 2001 (FR) .................................. 01 05316

(51) Int. Cl.
*H04L 9/00* (2006.01)
*H04K 1/00* (2006.01)
(52) U.S. Cl. .................. 713/170; 380/269; 380/44; 713/184; 713/175
(58) Field of Classification Search .............. 713/170, 713/184, 175; 380/269, 44
See application file for complete search history.

(56) References Cited

U.S. PATENT DOCUMENTS

| | | | | |
|---|---|---|---|---|
| 4,799,061 A | * | 1/1989 | Abraham et al. | 340/5.26 |
| 4,882,779 A | * | 11/1989 | Rahtgen | 705/72 |
| 5,227,613 A | * | 7/1993 | Takagi et al. | 235/380 |
| 5,602,917 A | * | 2/1997 | Mueller | 380/284 |
| 5,703,949 A | * | 12/1997 | Rosen | 705/65 |
| 5,883,958 A | * | 3/1999 | Ishiguro et al. | 705/57 |
| 5,915,021 A | * | 6/1999 | Herlin et al. | 705/67 |

(Continued)

FOREIGN PATENT DOCUMENTS

WO   WO 97/38530   10/1997

OTHER PUBLICATIONS

Menezes "Handbook of Applied Cryptography", XP-002186996, 1997 pp. 408-409, 508 and 559.

*Primary Examiner*—Emmanuel L. Moise
*Assistant Examiner*—Techane J. Gergiso
(74) *Attorney, Agent, or Firm*—Osha Liang LLP

(57) ABSTRACT

A method for a secure transmission of information between a first and a second module is disclosed. Each module contains one of the keys of two pairs of keys. A first number and a second number are randomly generated in the first module, and a third number is randomly generated in the second module. A check is made that a random number encrypted by one of the modules, then decrypted by the other, then re-transmitted re-encrypted to the initial module, is after decryption in the latter identical to the original random number. In each of the modules a common session key K is created independently with at least three same numbers generated randomly partially in one module and partially in the other module. Information transmitted between the two modules is encrypted with the common session key.

9 Claims, 2 Drawing Sheets

U.S. PATENT DOCUMENTS

| | | | |
|---|---|---|---|
| 6,011,848 A * | 1/2000 | Kanda et al. | 713/170 |
| 6,119,227 A * | 9/2000 | Mao | 713/171 |
| 6,151,676 A * | 11/2000 | Cuccia et al. | 713/176 |
| 6,157,719 A * | 12/2000 | Wasilewski et al. | 380/210 |
| 6,292,568 B1 * | 9/2001 | Akins et al. | 380/239 |
| 6,385,317 B1 * | 5/2002 | Rix et al. | 380/258 |
| 6,424,717 B1 * | 7/2002 | Pinder et al. | 380/239 |
| 6,490,680 B1 * | 12/2002 | Scheidt et al. | 713/166 |
| 6,577,733 B1 * | 6/2003 | Charrin | 380/251 |
| 6,601,771 B2 * | 8/2003 | Charrin | 235/492 |
| 6,792,113 B1 * | 9/2004 | Ansell et al. | 380/284 |
| 6,961,849 B1 * | 11/2005 | Davis et al. | 713/167 |
| 7,085,931 B1 * | 8/2006 | Smith et al. | 713/182 |
| 7,095,851 B1 * | 8/2006 | Scheidt | 380/44 |
| 7,096,494 B1 * | 8/2006 | Chen | 726/9 |
| 7,162,642 B2 * | 1/2007 | Schumann et al. | 713/189 |
| 2001/0001014 A1 * | 5/2001 | Akins et al. | 380/241 |
| 2003/0196092 A1 * | 10/2003 | Raley et al. | 713/176 |
| 2005/0010778 A1 * | 1/2005 | Walmsley | 713/176 |
| 2005/0114666 A1 * | 5/2005 | Sudia | 713/175 |
| 2006/0041752 A1 * | 2/2006 | Tuvell et al. | 713/171 |
| 2006/0248347 A1 * | 11/2006 | Smith et al. | 713/185 |

* cited by examiner

METHOD FOR SECURE COMMUNICATION BETWEEN TWO DEVICES

FIELD OF THE INVENTION

The invention concerns processes for establishing secure transmissions between a first and a second device, in particular between a digital television decoder and a smart card, making it possible to ensure that the user is entitled to use the said decoder.

STATE OF THE ART

When a first device for example a decoder needs to exchange confidential information with a second device, such as a smart card, it is usual to verify that the second device is entitled to receive this confidential information. In the case of scrambled digital television, the confidential information consists of a control word (CW) received by the decoder with the data stream comprising, in particular, a scrambled digital television programme. The control word is included in the entitlement control message. The control word is itself encrypted. In order to verify that a user owning the second device, for example a smart card, is entitled to receive the data stream, for example as a television programme, the encrypted control word is sent to the smart card. The smart card possesses a renewable key which is received periodically for example by means of an entitlement management message (EMM). If the key contained in the EMM is a valid key, for instance an up to date key, it will allow the decryption of the control word (CW). The control word is then transmitted to the decoder which will use it to decrypt the programme that has been previously encrypted. In the method just described, there is no encryption for the transmission of the encrypted CW between the first module, for example the decoder, and the second module, for example the smart card. Similarly, there is no decryption for the transmission of the decrypted control word from the smart card to the decoder. In order that the CW should not travel between the smart card and the decoder in a non-encrypted manner, it is the practice of the prior art to encrypt the control word.

Application WO 97/38530 by Digko shows at the top of page 4 a process for the coding of the control word. This process is as follows: When a smart cart 5 is inserted in the decoder, a microprocessor 8 of an access control module 4 of the decoder generates two random numbers Ci and A. Microprocessor 8 encrypts random numbers Ci and A with a public key of the access controller 4. A first message thus encrypted containing numbers Ci and A is transferred to smart card 5. A microprocessor 10 contained in smart card 5 decrypts this first message using the private key (contained in smart card 5) of access controller 4. Microprocessor 10 of smart card 5 then sends a second message to access controller 4, this second message being random number A encrypted with random number Ci used as encryption key. Microprocessor 8 of access controller 4 decrypts this second message and checks that random number A is correct, ie, that it is indeed equal to the access number A that was sent initially. If this verification is positive, it is considered that the inserted smart card 5 that has been inserted is an authorized one. Under such circumstances, access controller 4 will transmit the control message containing the encrypted control word to smart card 5 which will process the entitlement control message in order to extract the control word from it in a known manner. However, in the return message to access controller 4, smart card 5 will send the extracted control word but as encrypted with key Ci and this encrypted control word will be decrypted by microprocessor 8 in access controller 4 by using-the same key Ci. It is concluded in the application that if there is an attempt to replace initially inserted smart card 5 by another card, for example by replacing authorized smart card 5 by an unauthorized one, access controller 4 will immediately notice the change since Ci key is unknown to the new card, with the result that access controller 4 will no longer be able to unscramble the return message containing the control word. This means that decoder decrypting unit 7, which normally needs to use this control word in order to function, will be disabled. It is then similarly stated that this same process can be used for establishing a secure communication between access controller 4 and a decoder in which the same protocol as the one shown in an attached figure is adopted. Therefore, if a new access controller 4 is connected to other parts of the decoder, the decoder's microprocessor will generate the two random words Ci et A and as soon as the microprocessor has decrypted the second message received from microprocessor 8 belonging to access controller 4 and has checked that random number A is correct, key Ci will be used in all the transmissions between access controller 4 and microprocessor 6 of the decoder used for decoding the scrambled television programme.

In the example described in application WO/38530, session key constituted by number Ci is transmitted between the two modules, from access controller 4 to smart card 5, and from smart card 5 to access controller 4. Although the transmission is encrypted, it is possible to intercept this key during transmission, to decrypt it and to use id.

BRIEF DESCRIPTION OF THE INVENTION

This invention purports to provide a communication process between two modules, a first and a second, showing improved security with respect to the prior art described for example in the aforementioned patent. According to the invention, each of the two modules, for example a first module being a decoder and a second module being a smart card, are respectively provided with a public key and a private key. These public and private keys are respectively generated in a known manner so that each of these keys will encrypt a message that can be decrypted by the other. Two pairs of keys are created: the first module is loaded with a public key and the second module is loaded with the matching private key; similarly the second module is loaded with a public key and the second module is loaded with the matching private key. The following method is then used.

First, starting for example with the first module, namely the decoder, the following operations are carried out. A session number S and a random number A1 are generated by a random number generator in the decoder. Session number S and random number Ai are then encrypted using the smart card's public key. The encrypted session number and random number are sent to the smart card.

In the smart card, numbers S and A1 are decrypted by using the smart card's private key. This key is the one belonging to the public key/private key of a first pair. The smart card then generates, by means of a random number generator in the card, a second random number A2. This random number and S are encoded in the smart card using the decoder's public key. Numbers A2 and S thus encrypted are transmitted to the decoder. Additionally, a random session key K is generated in the smart card by means of a chopping function and the values S, A1 and A2.

When session number S and the second random number A2 have been received by the decoder, this session number and number A2 are decrypted by means of the decoder's private key. A check is then made that number S is indeed the one initially sent by the decoder. If this is not the case, the communication-session is stopped. By means of a chopping function and values of S, A1 and A2, a random session key K is generated in the decoder and this key is used to encrypt S. The result of the encryption of S with session key K is then sent to the smart card.

S is decrypted by means of key K in the smart card. A check is made that number S is indeed the initial session number sent. If this is not the case, the communication between the two modules is stopped. In this way, each of the two modules ends up loaded with the same session key K without this key having been transmitted between the two modules. Key K is then used by each of the two modules to encrypt the information transmitted from one module to the other.

In the illustrated example where the first module is a decoder, the information to be transmitted is the entitlement control message (ECM) containing the control word. This ECM is encrypted with key K and is transmitted to the smart card. In the smart card, the ECM encrypted by means of key K is decrypted by means of the same key. The decrypted ECM is then processed by the smart cart to extract the control word. This is then encrypted by key K and this encrypted result is transmitted to the decoder. Having received this message, the decoder decrypts the control word by means of key K. The decoder is thereby authorized to decode because it will have received the word enabling the decoding, for example, of the received programme.

To recap, the invention relates to a method for the secure transmission of information between a first and a second module each containing one of the keys of two pairs of keys, in which is generated in random fashion a first and a second number in the first module, a third number in the second module and where:

a check is made that a random number encrypted by one of the modules and then decrypted by the other and retransmitted encrypted to the initial module is, after decryption in that module, identical to the original random number, a common session key is created independently in each of the modules using at least three same numbers randomly generated partially in one module and partially in the other, and transmitted as encrypted data between the two modules so that the two modules contain the said at least three numbers, the information transmitted between the two modules is encrypted with the common session key.

In one embodiment described below in more detail, the method for the secure transmission of information between two modules—a first module and a second module—the stages of the method are as described hereafter.

It is assumed that the first and second modules are each loaded with a key which forms part of a first pair of keys containing one public key and one private key;

the first module at least is equipped with a random number generator;

the method includes, as in the prior art described in the connection with the aforementioned patent, the following operations:

a)—generation in the first module of the two random numbers, a first one, S, and a second one, A1.

b)—encryption in the first module of the two random numbers with the public key.

c)—transmission from the first to the second module of a first message containing the first and second numbers S and A1 encrypted with the public key of the first pair of keys.

d)—decryption in the second module of the first and second numbers S and A1 with the private key of the first pairs of keys.

The method of the invention is different from the prior art and is characterized in that the first and second modules being each equipped:

with one of the keys of a second pair of keys comprising one public key and one private key, with a unit generating keys from the random numbers it receives, the method includes the additional following operations e)—generation by the second module of a third random number A2, f)—encryption, in the second module, of the first and third random numbers with the public key of the second pair of keys.

g)—transmission from the second to the first module of the first and third random numbers encrypted with the public key of the second pair of keys, h)—decryption, in the first module, of the first and second random numbers encrypted with the public key of the second pair of keys.

i)—verification in the first module that the first random number generated by the random number generator of the first module is identical with the first random number encrypted with the public key of the second pair of keys as received from the second module.

It can be seen that at the end of the above operations, the first module has sent to the second a random number that has been encrypted in the first module, sent to the second, decrypted in the second and then re-sent to the first which had decrypted it and checked that the original number sent and the number resulting from the preceding encrypted transmission operations between the two modules are identical.

The operations then take place in the following manner:

j)—a session key K is created in each of the two modules by the session key generator contained in each module, each such generator internally receiving the three numbers A1, A2 and S in order to create the said key, k)—the first module sends to the second a first random number encrypted with session key K, l)—the second module checks that the first random number as decrypted by the second module with the private key of the first pair of keys is identical to the first random number as decrypted with session key K, created in the second module.

Operation 1 therefore establishes that numbers S and A2 transmitted from the second to the first module have been received and decrypted by the first module. The identity of A2 is implicitly checked because if A2 has not been correctly decrypted, session key K with which the first module has encrypted S is not the same as session key K create in the second module and if this occurs, the initial value of S will not be obtained in the decryption by the second module of the message containing S encrypted with key K from the first module.

It is therefore seen that at the conclusion of operation 1), a symmetrical check has been made that in each of the two modules a random number encrypted by one of the modules and then decrypted by the other and resent encrypted to initial module is, after decryption the latter module, identical to the original random number, and a common session key has been created independently in each of the two modules by means of at least three same numbers randomly generated partially in one module and partially in the other, and transmitted as encrypted data between the two modules in order that both modules contain the at least three numbers.

It is clear that there will be:

m)—a stop to the transmission of information between the two modules if one of the two checks carried out at i) or l) that the first random number S is identical with one of its transforms by encryption proves negative, or on the contrary, n)—a continuation of the transmission of information using session key K if none of the operations i) or l) to check that the first random number S is identical to one of its transforms by encryption proves negative.

BRIEF DESCRIPTION OF THE DRAWINGS

The invention will now be described with reference to the attached drawings in which.

DETAILED DESCRIPTION OF THE INVENTION

Figure 1:
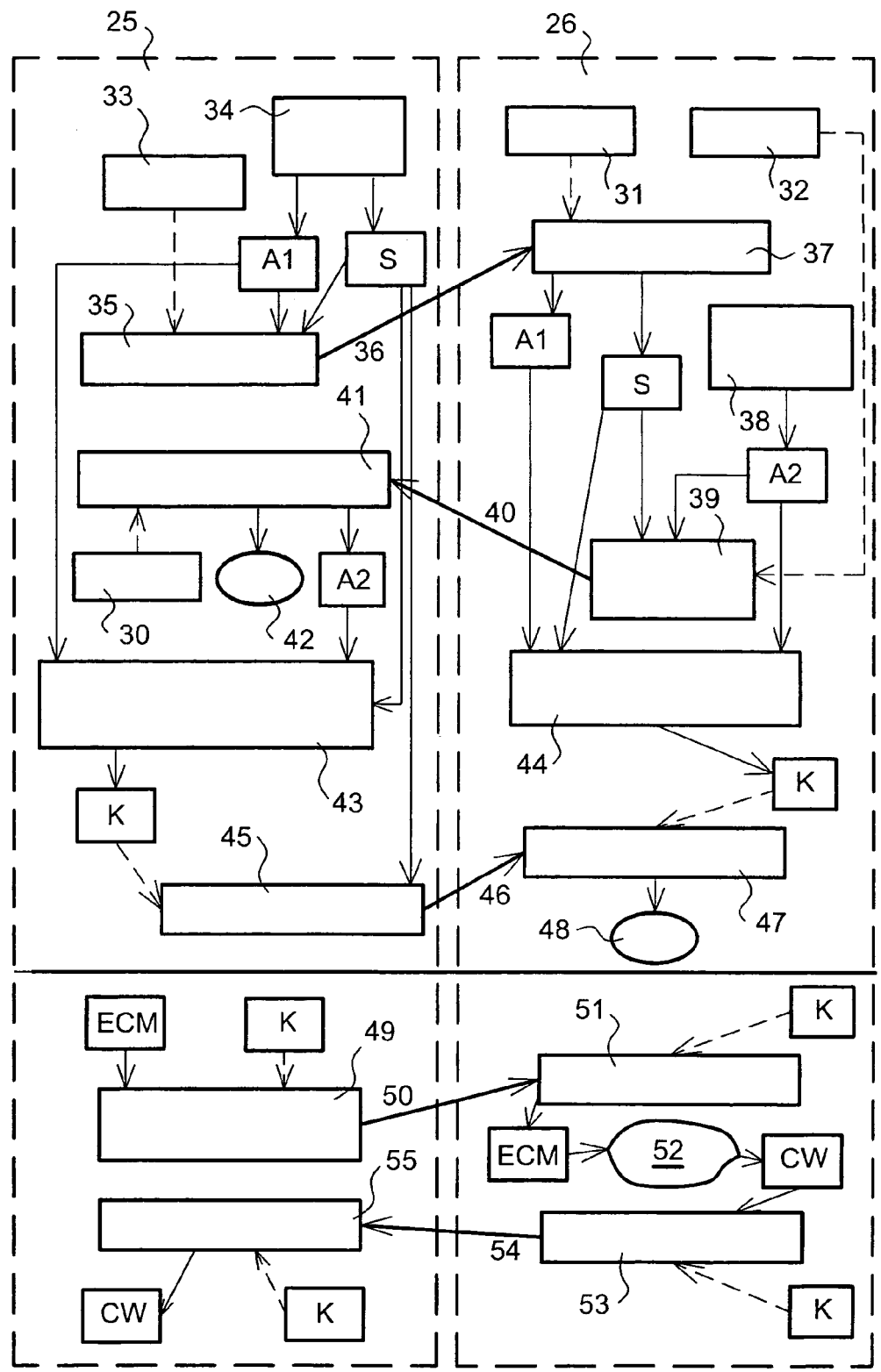
FIG. 1 illustrates a general embodiment of the invention.

FIG. 1 represents a flow chart in two parts, 25 and 26.

Part 25 contained within dotted lines shows the flow chart of the operations effected by the decoder. Part 26 contained within dotted lines shows the operations effected in the smart cart. Arrows 36, 40, 46, 50 and 54 represent the transmissions that take place between the first and the second, or between the second and the first modules according to the direction of the arrow. One will note firstly that the first and second modules have a first pair of keys 33, 31, key 33 being the public key of smart card 26 and key 31 being the private key of the said card. A second pair of keys 32, 30 comprises a private key 30 in module 25 and a public key 32 in module 26. Access control sequence starts with an initialization routine which is not illustrated here and is triggered off, for example, by the insertion of smart card 26 into decoder 25.

At step 34, a random number generator of decoder 25 generates a session number S and a first number A1. At step 35, numbers A1 and S are encrypted by means of second public key, No. 33, of second module 26. A first transmission 36 then takes places to send numbers A1 and S to second module 26, the smart card. At step 37 carried out in smart card 26, numbers A1 and S that have been encrypted at step 35 are decrypted with private key 31 of smart card 26. A random number generator in the card generates, at step 38, a random number A2.

At step, 39, numbers S and A2 are then encrypted with public key 32 contained in smart card 26. The result of this encryption is sent to step 40 in module 25. This module decrypts, at step 41 by means of private key 30 of decoder 25, session number S and second random number A2. A check is then made at step 42 in module 25 that the session number S decrypted at step 41 is indeed equal to the session number S generated at step 34. If the same value of S is not obtained, the exchange of communication is terminated. But if the value of S is found, a session key K is generated at step 43. During that same step, numbers S, A1 and A3 are subjected to a chopping function whose result is precisely session key K. In module 26, the same chopping function is applied, at step 44, to random numbers A1, A2 and session number to obtain session key K. In module 25, session key K is used at step 45 to encrypt S. The result of this encryption is sent, at step 46, to smart card 26 in which session number S is decrypted at step 47 by using key K created at step 44. The result of this decryption is checked during step 48. If S is not found, the communication is stopped. Given the failure of the authentication, card 26 will refuse to operate further until a new session is activated. If S is found, then the communication can continue.

The chopping methods are the same in module 25 and card 26, and have been introduced at an earlier stage.

It can be noted at this point that it is not compulsory apply a chopping method to the three numbers A1, A2 and S to obtain session key K, but the method used to obtain K should preferably have, just like the chopping method, a pseudo random output. The advantage of a chopping function is that it prevents any reversal of the results, ie, an upstream return to numbers S, A1 and A2.

If keys K are the same, an exchange of data can take place between modules 25 and 26, all the data sent from module 25 to module 26 or from module 26 to module 25 being encrypted with key K and decrypted with this same key by the other module. It is therefore seen that in this method, there is no exchange of key between the first module 25 and second module 26.

Similarly, in the method according to the invention, there is a symmetry in the role undertaken by each of modules 25 and 26 in the creation of the session key. In addition, the session key is more secure because its generation is based on two random variables (A1, A2) each of which is generated by one of the parts.

The encryption and decryption operations are speedy because symmetrical methods are used. Moreover, during a same sessions communications between the modules in both directions are encrypted. In the example examined here, where the first module is a decoder or possibly an access enabling module to the decoder, the sequence of operations comprises the transmission of enabling message from decoder 25 to smart card 26, the processing of this message to extract the control word W, and the return transmission of this control word, encrypted with key K, to module 25 which will then, by means of the control word, be able to decrypt the scrambled digital data received in order to extract from them unscrambled television video data.

The date exchange that follows the opening of a session is illustrated at the bottom of FIG. 1 beneath the horizontal line. In module 25, at step 49, the entitlement check message (ECM) is encrypted by previously established key K. At step 50, this message is sent to module 26 in its encrypted form. The message is then decrypted in module 26 at step 52 by means of key K created at step 44. The ECM message is then processed at step 52 to extract control word CW. This control rod is encrypted at step 53 by means of key K.

At step 54, the encrypted messaged containing control word CW is sent to module 25. The control word is decrypted with key K at step 55 and the control word CW is extracted therefrom.

Thus in this particular use, the method according to one of the variants of the invention is used for a secure transmission between a first module 25 being a digital television decoder containing a decoding function for a stream of scrambled video data or being a conditional access module for such a decoder, and a second module 26 being a device for logging access entitlement, such as a smart card. This card periodically receives in a way known within itself an entitlement management message (EMM). The exchange of information encrypted with common session key K between the first and the second module, and a processing of the exchanged information involve the following information which has been commented above in connection with the lower part of FIG. 1:

transmission of a entitlement control message (ECM) containing the control word (CW) allowing the unscrambling of the scrambled data stream to take place, from the first to the second module, decryption of the ECM, processing of the ECM in the second module in order to extract from it the CW contained in the said ECM message, encryption in the second module, by means of common session key K, of the said control word CW, transmission from the second to the first module of the said control word CW as encrypted, decryption in the first module, by means of common session key K, of the said control word CW and its eventual use for the unscrambling of a scrambled data stream.

Figure 2:
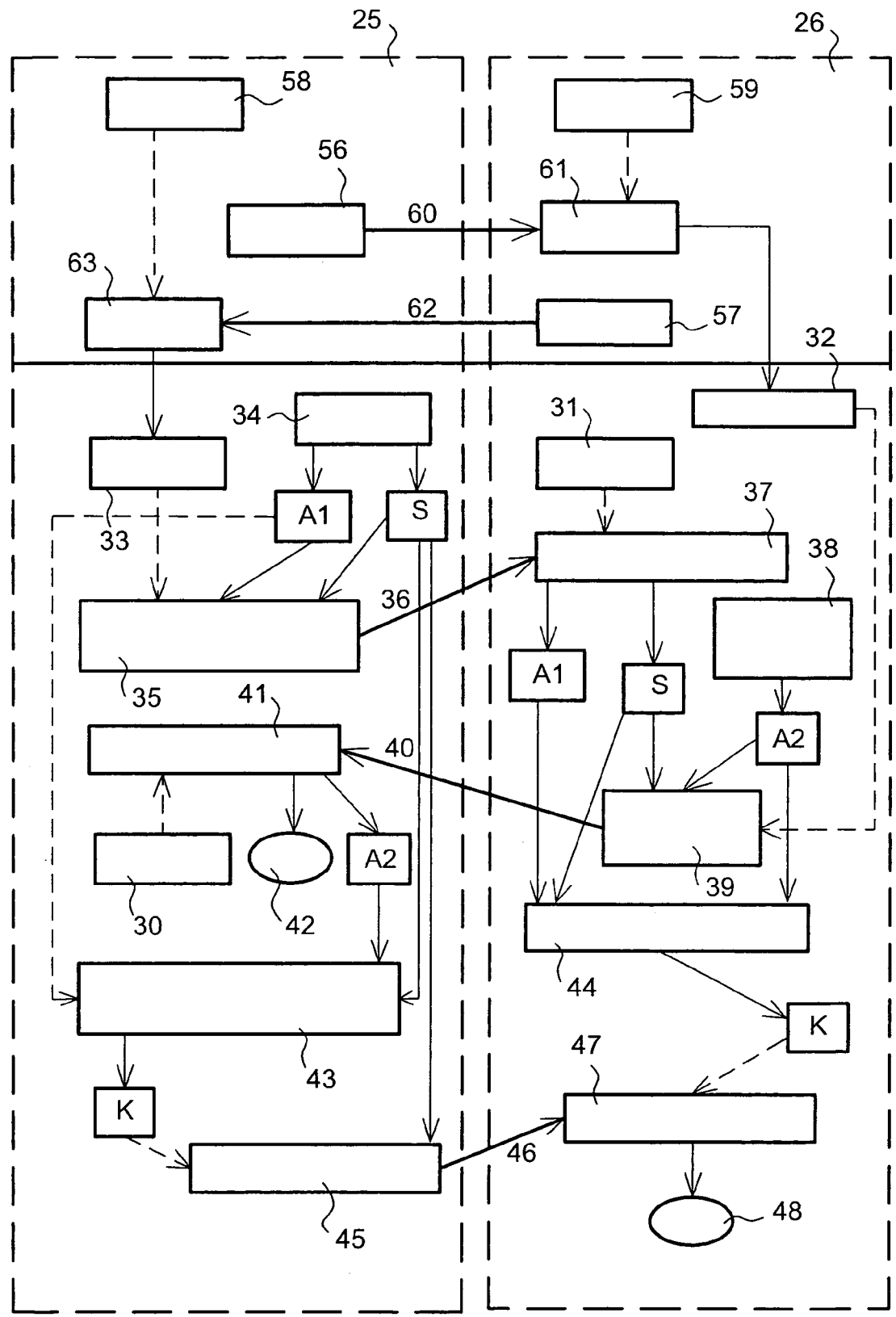
FIG. 2 illustrates a preferred embodiment of the invention.

FIG. 2 contains and upper and a lower part separated by a thick line.

Lower part of FIG. 2 represents the same method as that illustrated in upper part of FIG. 1. This part of the invention will not be described again.

In the preferred embodiment, illustrated on upper part of FIG. 2, decoder 25 and smart card 26 each are in possession of certificate 56, 57 respectively. These certificates can comply with standard X509, for example. Certificate 56 of decoder 25 contains public key 32 of the said decoder 25. Conversely, certificate 57 of smart card 26 contains public key 33 of smart card 26. As in the prior art described in connection with FIG. 1, decoder 25 and smart card 26 are respectively loaded with private keys 30 and 31, associated to their respective public keys 32 and 33. Moreover, in this embodiment, decoder 25 and card 26 have public certification keys 58 and 59, respectively, which are associated to certificates 57 and 56. As a preliminary to the steps described in connection with FIG. 1, the following steps are carried out.

At step 60 the decoder sends certificate 56 to smart card 26. When this certificate is received, a check takes place in card 26, at step 61, that a signature contained in certificate 56 is a valid signature. This check is carried out by means of public certification key 59 contained in smart card 26. If the check yields a positive result, public key 32 can be extracted from certificate 56. Conversely, smart card 26 sends certificate 57, at stage 62, to decoder 25. This decoder carries out a check on certificate 57 by means of certification key 58 and if this check yields a good result, is it able to extract from it public key 33.

When this preliminary exchange is completed, the situation is as described for FIG. 1. Public key 32 of the first module, extracted from the first certificate 56, constitutes, with private key 30 of the first module, the first pair of keys, and public key 33 of the second module 26, extracted from the second certificate 57, constitutes, with private key 32 of the second module, the second pair of keys.

In the above description of the method of the invention and its uses, mention has been made of "operations" and not of "steps" as it will be clear to the practitioner that the order of the operations described need not necessarily be that of the operations as related in the description. Some of these operations can be carried out in a different time order or even concurrently. The only condition that has to be met during a given operation is that at the start of the process, that information has been received by a module that has to process it.

The invention claimed is:

1. A method for secure transmission of information between a first and a second module, each module comprising one of the keys of a first pair of keys and one of the keys of a second pair of keys, the method comprising:

generating a first random number and a second random number in the first module;

generating a third random number in the second module;

checking that one of the first, second, and third random numbers encrypted by one of the modules, then decrypted by the other of the modules, then re-transmitted re-encrypted to the one of the modules, is, after decryption in the one of the modules, identical to the one of the first, second, and third random numbers; and creating independently in each of the modules a common session key with at least three same numbers generated randomly partially in one module and partially in the other module, and transmitted as encrypted data between the two modules so that the two modules contain the at least three numbers;

transmitting the certificate from the second module to the first module;

verifying, in the first module, the signature of the certificate with a public certification key of the first module; and extracting a public key of the certificate, wherein the extracted public key and a private key of the first module form the first pair of keys, wherein information transmitted between the two modules is encrypted with the common session key.

2. The method of claim 1, wherein the first module has a first public certification key and a first certificate containing a digital signature, and the second module has a second public certification key and a second certificate containing a digital signature, the method further comprising:

transmitting the first certificate from the first module to the second module;

verifying, in the second module, the signature of the first certificate with the second public certification key; and extracting a public key contained in the first certificate, wherein the public key extracted from the first certificate and a private key of the first module form the first pair of keys, and the public key extracted from the second certificate and a private key of the second module form the second pair of keys.

3. The method of claim 1, wherein creating the common session key comprises applying a hashing function to the at least three same numbers.

4. The method of claim 1, wherein the first module is one of a digital television decoder containing a decoding function of a stream of digital scrambled data and a conditional access module for such a decoder, and the second module is an access entitlement device, and the exchange of information encrypted with the common session key between the first module and the second module and the processing of the information exchanged comprises:

transmitting from the first module to the second module an entitlement control message containing a control word allowing unscrambling of the scrambled data stream;

decrypting the entitlement control message;

extracting the control word contained in the entitlement control message in the second module;

encrypting the control word with the common session key in the second module;

transmitting the control word from the second module to the first module; and decrypting the control word by means of the common session key.

5. A method for secure transmission of information between a first module and a second module, wherein each of the modules comprises one of a first pair of keys and one of a second pair of keys, each of the pairs of keys comprising a public key and a private key, the first and second modules each comprise a session key generator, and at least the first module comprises a random number generator, the method comprising:

generating a first random number and a second random number in the first module;

encrypting the first and second random numbers with the public key of the first pair of keys in the first module;

transmitting from the first module to the second module a message comprising the first and second random numbers encrypted with the public key of the first pair of keys;

decrypting the first and second random numbers with the private key of the first pair of keys in the second module;

generating a third random number in the second module;

encrypting the first and third random numbers with the public key of the second pair of keys in the second module;

transmitting the encrypted first and third random numbers from the second module to the first module;

decrypting the encrypted first and third random numbers in the first module;

verifying that the first random number generated by the random number generator in the first module is identical to the first random number encrypted with the public key of the second pair of keys as received from the second module;

wherein when the verification shows that the random number generated by the random number generator in the first module is different from the first random number encrypted with the public key of the second pair of keys, the exchange of communication is terminated, and wherein when the verification shows that the random number generated by the random number generator in the first module is identical to the first random number encrypted with the public key of the second pair of keys, a session key is created in each of the two modules by the session key generator of each module using the first, second, and third random numbers, wherein the session key generator of each module internally receives the first, second, and third random numbers;

encrypting the first random number in the first module with the session key;

sending the first random number encrypted with the session key from the first module to the second module;

decrypting, using the session key, in the second module, the first random number encrypted by the session key;

checking, in the second module, that the first random number as decrypted by the second module with the private key of the first pair of keys is identical to the first random number as decrypted with the session key created in the second module;

interrupting the transmission of information between the two modules if one of verifying and checking the first random number fails; and continuing the transmission of information using the session key if verifying and checking the first random number does not fail;

wherein communication between the first module and the second module terminates until a new session is activated, if verification of the first random number fails.

6. The method of claim 5, wherein the second module further comprises a public certification key and a certificate including a digital signature, the method further comprising:

transmitting the certificate from the second module to the first module;

verifying, in the first module, the signature of the certificate with a public certification key of the first module; and extracting a public key of the certificate, wherein the extracted public key and a private key of the first module form the first pair of keys.

7. The method of claim 5, wherein creating the common session key comprises applying a hashing function to the first, second, and third random numbers.

8. The method of claim 7 in which the access entitlement device is a smart card.

9. The method of claim 5, wherein the first module is one of a digital television decoder containing a decoding function of a stream of digital scrambled data and a conditional access module for such a decoder, and the second module is an access entitlement device, and the exchange of information encrypted with the common session key between the first module and the second module and the processing of the information exchanged comprises:

transmitting from the first module to the second module an entitlement control message containing a control word allowing unscrambling of the scrambled data stream;

decrypting the entitlement control message;

extracting the control word contained in the entitlement control message in the second module;

encrypting the control word with the common session key in the second module;

transmitting the control word from the second module to the first module; and decrypting the control word by means of the common session key.

* * * * *